May 31, 1949. D. E. BERGGREN 2,471,998
COLUMN STAND FOR SUPPORTING APPARATUS VERTICALLY
MOVABLE ALONG THE COLUMN, PARTICULARLY
X-RAY APPARATUS
Filed July 2, 1946

Inventor:
DETLOF EMANUEL BERGGREN
By
Agent

Patented May 31, 1949

2,471,998

UNITED STATES PATENT OFFICE 2,471,998

COLUMN-STAND FOR SUPPORTING APPARATUS VERTICALLY MOVABLE ALONG THE COLUMN, PARTICULARLY X-RAY APPARATUS

Detlof Emanuel Berggren, Eindhoven, Netherlands, assignor to Hartford National Bank and Trust Company, Hartford, Conn., as trustee Application July 2, 1946, Serial No. 680,960
In the Netherlands March 22, 1943

Section 1, Public Law 690, August 8, 1946
Patent expires March 22, 1963

5 Claims. (Cl. 248—123)

For the purpose of supporting apparatus which must be vertically adjustable, such as, for instance, X-ray apparatus and irradiation sets for ultra-violet rays, use is often made of column-stands. In order to keep the apparatus in equilibrium, use is made in some cases of a counterpoise which is connected to the apparatus by means of a suspension wire or chain. Such devices, however, present some disadvantages. The total weight of the stand is increased by the weight of the counterpoise and the mass that must be acted upon when shifting the apparatus is increased by the counterpoise. The latter circumstance influences the speed with which the apparatus can be moved from one position to another. When performing operations involving frequent movement of the apparatus one will soon get tired.

In this respect the use of a spring for keeping the vertically movable apparatus in equilibrium has material advantages. In the prior art, there are several uses of springs for keeping in equilibrium X-ray apparatus vertically movable along a column-stand but all of them have the disadvantage that the elastic force varies with the stretching of the spring. In the present invention, in order to achieve correspondence between the stressing force of the spring and the weight of the apparatus in any position the apparatus may occupy, the suspension wire which transfers the force of the spring to the apparatus is fixed to a conical drum, the conical surface of which comprises a helical groove. According as the apparatus shifts, the wire occupies a different position in the groove and the tangential point of application shifts in the direction of a generatrix on the drum, the momentum of suspension varying in accordance with the stretching force of the spring when the unit is displaced.

Use has heretofore been made in the prior art of helically wound springs one end of which is connected to the column, the other end of the spring being connected by means of a pull wire to the periphery of the drum. (In a further form of construction the spring was secured to the drum via an auxiliary roller.) The change in length to which the spring is subjected when the unit is displaced is, other things being equal, for the former form of construction twice as great as in the latter case.

Figure 5:
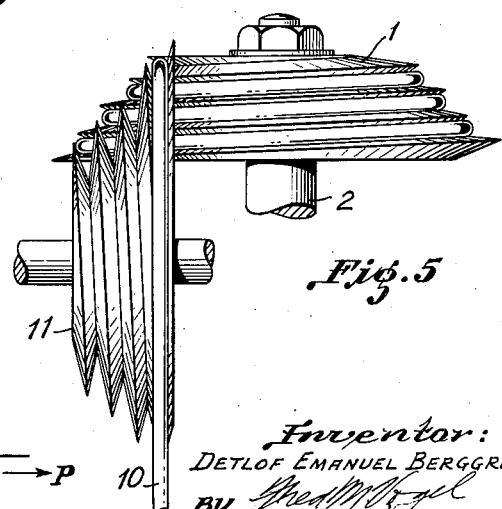

Figure 5, perspective view of the two groove drums.

Figure 1:
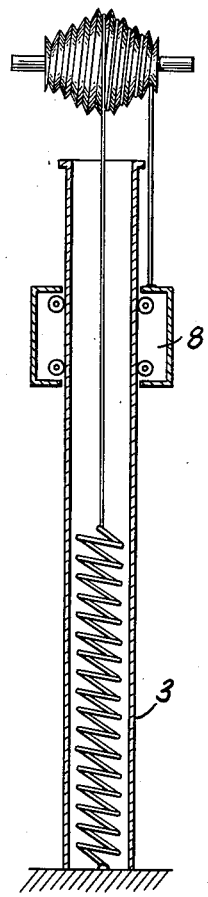
Figure 1 represents diagrammatically one form of construction of a similar device in the prior art.
Figure 2:
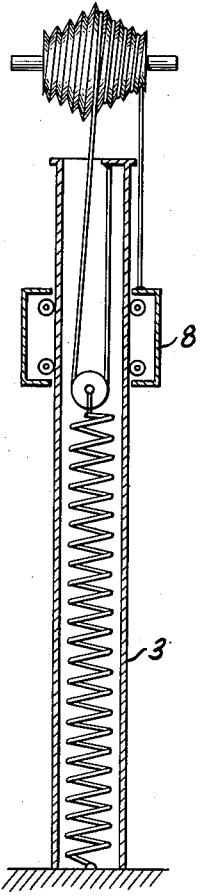
Figure 2 represents diagrammatically another form of the prior art construction.

Figs. 1 and 2 of the drawing represent diagrammatically these two forms of construction of the prior art. The device shown in Fig. 1 must comprise a spring which is less rigid than the spring which may be used according to Fig. 2. The energy accumulated in the spring is different in either case and this leads to a difference in stability of the devices. In connection with both forms of construction of the prior art, however, the observation applies that the difference in tensile strength of the springs in the extreme positions which the unit may occupy is very large, so that large differences in diameter must be made on the drum in order to keep the bearing-power constant. Due to this, the entire arrangement becomes very critical and this causes a disagreeable phenomenon in the case of readily movable units on account of the fact that the apparatus moves spontaneously even at slight vibrations or shocks.

According to this invention, it has been found that these disadvantages can be largely reduced in column stands where use is made of a helical spring, which is secured to the column in such manner that the elastic force is developed and active in the direction of the turns by tightly coiling the spring. The spring may extend throughout the length of the column, with the result that the volume of resilient material is correspondingly larger than in the prior art devices in which the spring in the unstretched condition fills only part of the column in order to provide space for the point of connection of the pull wire and the spring to move vertically when the supported unit is shifted. The energy accumulated in the spring in the present invention can therefore be much greater. In addition, in the present invention the strain on the spring material is much more favorable, because in the case of the prior art draw-spring the material is torsioned, whereas in the case of a rotary spring action according to the invention herein the spring is coiled and subjected to tension, which permits the spring to be subjected to a 10 to 15% higher stress.

Figure 3:
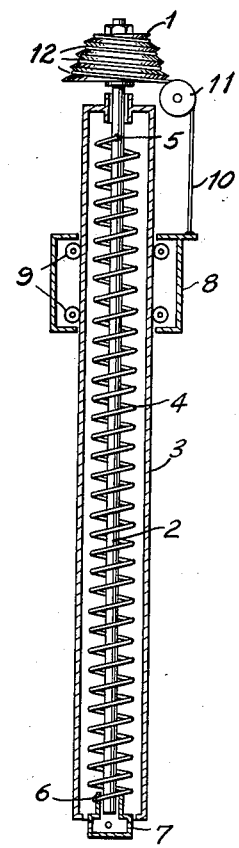
Figure 3 is vertical sectional view of the fundamental construction of the invention.

In order that the invention may be clearly understood and readily carried into effect it will now be described more fully with reference to the accompanying drawing in which Fig. 3 illustrates the fundamental idea of the invention. Similar to the well-known forms of constructions, the use of a conical drum 1 is required. The latter is fast on a vertical rotatable shaft 2. The shaft is supported in the column-stand 3 at its ends and is arranged internally of a helical spring 4, one end 5 of which is secured to the shaft. The other end of the spring is secured to a stretching or tensioning device 7, whose function will be set out hereinafter. Ultimately, the connection to the column-stand is thus established so that when the shaft rotates in the column, the stretching power of the spring varies. The rotation of the shaft 2 is brought about by lowering the supported unit 8, which is provided with rollers 9 by means of which it bears on the wall of the column 3, from the position shown. The unit is supported from the periphery of the drum 1 by means of a suspension wire 10 which is guided by an auxiliary roller 11. The drum 1 comprises a continuous groove 12 which extends helically in the conical surface so that the point of application of the suspension wire on the drum moves in the direction of a generatrix of the conical surface when the shaft rotates.

Figure 4:
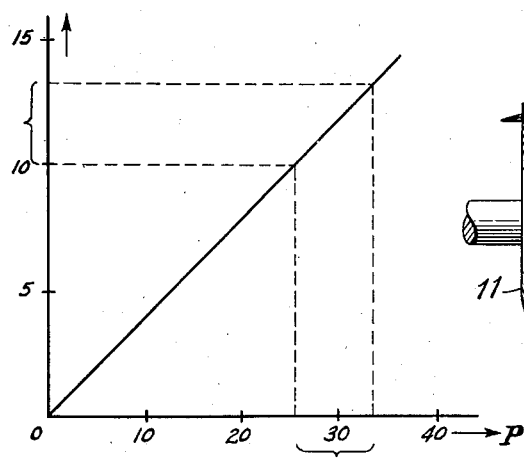
Figure 4 shows a graph which denotes the proportion between the tensile force at the drum and the number of revolutions required by the shaft to produce an equilibrant force.

The efficient use of the space available in the column permits of using a spring whose deformation, which occurs when the unit is displaced over the entire length of the column, is slight as against the total deformation to which the spring can be subjected if the entire force difference available is taken advantage of. To make this clear, Fig. 4 shows a graph which denotes the proportion between the tensile force at the drum and the number of revolutions the shaft must make in order to produce that stress in the spring at which these two forces are in equilibrium. The diameter of the drum is such that three revolutions of the shaft suffice to move the supported unit from one extreme position to the other. The total number of revolutions the shaft is adapted to make to completely stretch the spring is 15 and this shows that a but slight deformation of the spring occurs when the unit shifts. The disparity between the forces exerted by the spring in the two extreme positions of the unit is consequently but small, with the result that the differences in diameter of the drum can be small so that a very stable system is obtained. The correct initial stress of the spring can be secured by means of the stretching or tensioning device 7, to which the fixed point of attachment of the spring is connected. By the rotation of this device, the spring is wound up and this is continued until the correct intial spring stress will be obtained, said stress counterbalancing the weight of the apparatus.

The slope of the characteristic curve is a measure of the stiffness of the spring. A slighter slope means that the spring is more rigid and that the difference in stretching power or tension per revolution of the shaft is higher. A steeper slope means a slacker spring and a smaller difference in stretching power per revolution of the shaft. The choice of the diameter of the drum permits of choosing the ratio between the number of revolutions the shaft has to make to obtain the correct stress of the spring in order that the unit may keep its equilibrium and the number of revolutions the shaft has to make as the unit shifts from one extreme position to the other. The greater this ratio, the less conical need be the groove drum and the stabler becomes the suspension of the unit.

The auxiliary roller 11 may be constructed in form of a conical groove-drum, as shown in Fig. 5, in which the two groove drums are shown. At the side of the drum which is fast on the shaft 2 is arranged a smaller drum 11 over which the suspension wire passes to the unit. The small drum is grooved as well and has the same groove length as the large drum. In this case, in which the diameter is smaller than that of the fixed drum, the number of grooves must be higher. This ensures that the suspension wire is always wound up cleanly, as the point of application of the suspension wire on the guide drum is subjected to a displacement corresponding to that of the point of application on the fixed drum.

What I claim is:

1. A column-stand for supporting apparatus vertically movable along the column, particularly an X-ray unit, comprising a spring counteracting the weight of the apparatus by its tension and constituted by helically wound turns arranged adjacent to each other with one end adapted to be free and the other end adapted to be fixed, means supporting the spring so the free end of the spring is movable in response to movement of the supported apparatus so the elastic or tension force is active tangentially in the direction of the turns, and an adjustable spring-tensioning member having the fixed end of the spring secured thereto, said spring-tensioning member being adjustably anchorable on the column to thereby establish an initial stress in the spring and to secure the fixed end of the spring to the column.

2. A column-stand as claimed in claim 1, wherein one end of the spring is fixed to the column and the other to a rotatable shaft which extends inside the spring in the direction of length of the column, the shaft being provided with a transmission gear for converting the rotary movement of the shaft into a translatory movement.

3. A column stand for supporting apparatus vertically movable along the column, comprising a helical spring counteracting the weight of the apparatus; a rotatable shaft extending inside the spring in the direction of length of the column; a transmission gear for converting translatory movement of the apparatus to rotary movement of the shaft for tightening or loosening the spring, one end of which is attached to the shaft and the other end is adapted to be fixed to the column; and a tensioning device to which the fixed end of the spring is connected, said tensioning device being adjustably anchored on the column for adjustably pre-stressing the spring to control its initial stress.

4. A column stand as in claim 3, in which the spring is disposed in and extends throughout the length of the column.

5. A column stand as in claim 3, wherein the transmission gear includes a conical grooved drum seated on and secured to the rotatable shaft, a second conical grooved drum on an axis perpendicular to the axis of the first drum, and a suspension wire for supporting the apparatus is secured to the first drum and is guided by the grooves of both drums to the apparatus.

DETLOF EMANUEL BERGGREN.

REFERENCES CITED

The following references are of record in the file of this patent:

UNITED STATES PATENTS

| Number | Name | Date |
|---|---|---|
| 574,085 | Denton | Dec. 29, 1896 |
| 1,084,960 | Randall | Jan. 20, 1914 |
| 2,168,209 | Haupt | Aug. 1, 1939 |